United States Patent
Elswick et al.

(10) Patent No.: US 10,555,124 B2
(45) Date of Patent: Feb. 4, 2020

(54) CHARACTERIZING A VEHICLE BASED ON WIRELESS TRANSMISSIONS

(71) Applicant: GM GLOBAL TECHNOLOGY OPERATIONS LLC, Detroit, MI (US)

(72) Inventors: Richard Elswick, Warren, MI (US); Aditya S. Kamini, Bloomfield Hills, MI (US); Lakshmi V. Thanayankizil, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 15/905,460

(22) Filed: Feb. 26, 2018

(65) Prior Publication Data
US 2019/0268722 A1    Aug. 29, 2019

(51) Int. Cl.
*H04W 4/029* (2018.01)
*H04W 8/00* (2009.01)
*G06F 16/22* (2019.01)
*G06F 16/955* (2019.01)
*H04B 7/185* (2006.01)
*H04W 4/80* (2018.01)
*H04W 84/04* (2009.01)

(52) U.S. Cl.
CPC .......... *H04W 4/029* (2018.02); *G06F 16/22* (2019.01); *G06F 16/955* (2019.01); *H04W 8/005* (2013.01); *H04B 7/185* (2013.01); *H04W 4/80* (2018.02); *H04W 84/042* (2013.01)

(58) Field of Classification Search
CPC ......... H04W 4/46; H04W 4/48; H04W 4/029; H04W 8/005
USPC ........... 455/67.11, 456.3, 456.1, 414.2, 41.2, 455/452.1, 41.1
See application file for complete search history.

(56) References Cited

U.S. PATENT DOCUMENTS

| 2017/0246985 A1* | 8/2017 | Dellock | B60Q 1/2619 |
| 2017/0279957 A1* | 9/2017 | Abramson et al. | H04M 1/72577 |
| 2017/0368983 A1* | 12/2017 | Salter | F21V 21/30 |

* cited by examiner

*Primary Examiner* — John J Lee
(74) *Attorney, Agent, or Firm* — Reising Ethington P.C.; David Willoughby

(57) ABSTRACT

A system and method of determining vehicle characteristics of an unknown vehicle through evaluation of wireless signals transmitted by the unknown vehicle, wherein the method includes: obtaining information from a wireless receiving device, wherein the wireless receiving device is configured to listen for wireless signals from one or more wireless transmission devices, wherein the obtained information is based at least partly on one or more wireless signals transmitted by an unknown vehicle, and wherein the one or more wireless signals only include non-uniquely identifying vehicle information; determining one or more characteristics concerning the unknown vehicle based on evaluating the obtained information in connection with vehicle information data that is stored in a vehicle information database; and storing the one or more characteristics concerning the unknown vehicle in a database.

20 Claims, 3 Drawing Sheets

CHARACTERIZING A VEHICLE BASED ON WIRELESS TRANSMISSIONS

INTRODUCTION

The present invention relates to processing information pertaining to wireless transmissions to identify an unknown vehicle.

Vehicles include hardware and software capable of various multimedia functions, including playing audio received from radio stations, mobile devices (e.g., smartphones, tablets), many of which utilize wireless communications, such as short-range wireless communications (SRWC). Wireless signals transmitted by a vehicle can be received by other wireless devices that are listening for wireless communications and, thereafter, information pertaining to the transmitting vehicle may be obtained.

SUMMARY

According to one aspect of the invention, there is provided a method of determining vehicle characteristics of an unknown vehicle through evaluation of wireless signals transmitted by the unknown vehicle, wherein the method includes: obtaining information from a wireless receiving device, wherein the wireless receiving device is configured to listen for wireless signals from one or more wireless transmission devices, wherein the obtained information is based at least partly on one or more wireless signals transmitted by an unknown vehicle, and wherein the one or more wireless signals only include non-uniquely identifying vehicle information; determining one or more characteristics concerning the unknown vehicle based on evaluating the obtained information in connection with vehicle information data that is stored in a vehicle information database; and storing the one or more characteristics concerning the unknown vehicle in a database.

According to various embodiments, this method may further include any one of the following features or any technically-feasible combination of these features:

- the obtained information pertains to one or more signal characteristics of the wireless signals;
- the one or more signal characteristics includes a wireless protocol used for transmitting the one or more wireless signals;
- the one or more signal characteristics includes one or more frequencies of the one or more wireless signals;
- the one or more signal characteristics are based on imperfections in a transmitter that is included in the unknown vehicle and that is used to transmit the one or more wireless signals;
- an electronic signature for the unknown vehicle is generated based on the imperfections in the transmitter;
- the obtained information includes signal data that was included in the one or more wireless signals;
- the signal data includes at least one wireless device identifier;
- the signal data includes a plurality of wireless device identifiers;
- an electronic signature for the unknown vehicle is generated based on a combination of the plurality of wireless device identifiers;
- the at least one wireless device identifier is any one of the following: a media access control (MAC) address, a service set identifier (SSID), a wireless friendly name, a Bluetooth™ address (BD_ADDR), an integrated circuit card identifier (ICCID) of a subscriber identity module (SIM) card, an international mobile subscriber identity (IMSI) associated with a SIM card, or an issuer identification number associated with a SIM card;
- the wireless receiving device is included in a second vehicle, and wherein the second vehicle includes a telematics unit that is configured to provide the received information to the one or more servers;
- the step of informing a plurality of wireless receiving devices to listen for wireless signals, wherein the wireless receiving device is one of the plurality of wireless receiving devices;
- the step of receiving a location of the wireless receiving device and/or the unknown vehicle at the one or more servers;
- the step of determining whether the unknown vehicle is a vehicle of interest based on the determining step, and wherein the vehicle of interest is a lost or missing vehicle;
- the vehicle information database is a vehicle dimension database, and wherein the one or more characteristics are stored in a vehicle characteristic database along with the electronic signature; and/or
- the step of generating an electronic signature based on the obtained information, and wherein the one or more characteristics are stored in a vehicle characteristic database along with the electronic signature.

According to another aspect of the invention, there is provided a method of determining vehicle characteristics of an unknown vehicle through evaluation of wireless signals transmitted by the unknown vehicle, wherein the method is carried out by one or more servers that include access to a vehicle information database, and wherein the method includes: obtaining information from a wireless receiving device, wherein the wireless receiving device is configured to listen for wireless signals from one or more wireless transmission devices, wherein the obtained information is based at least partly on characteristics of one or more wireless signals transmitted by an unknown vehicle, and wherein the characteristics of the one or more wireless signals includes physical attributes of the one or more wireless signals and/or non-uniquely identifying vehicle data that is being conveyed by the one or more wireless signals; generating an electronic signature for the unknown vehicle based on the obtained information; determining whether information pertaining to the unknown vehicle exists in a vehicle information database based on the electronic signature for the unknown vehicle; determining one or more characteristics concerning the unknown vehicle based on evaluating the obtained information in connection with vehicle dimension data that is stored in a vehicle information database; and storing the one or more characteristics concerning the unknown vehicle in a vehicle characteristic database.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
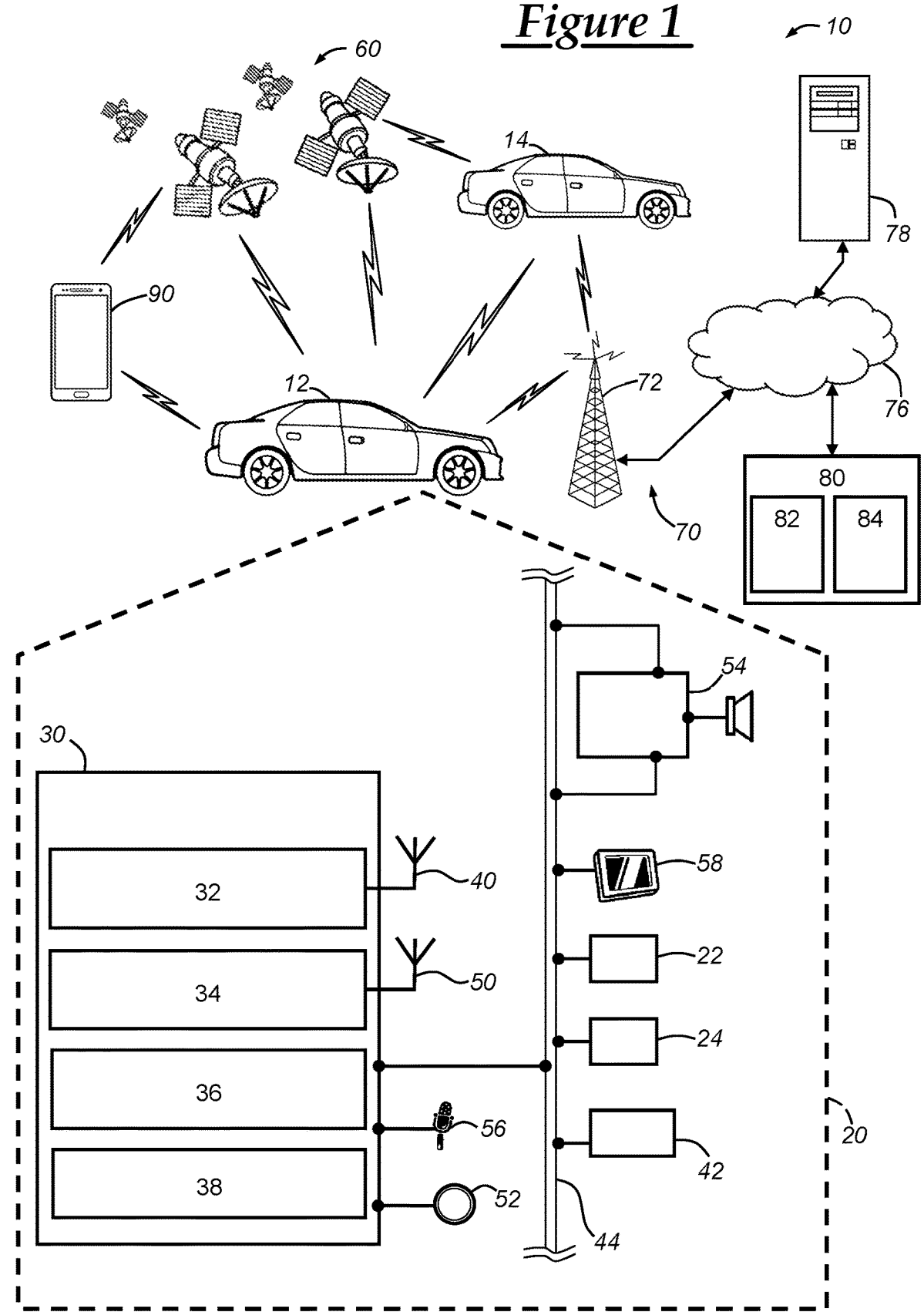
FIG. 1 is a block diagram depicting an embodiment of a communications system that is capable of utilizing the method disclosed herein.

The system and method described below enables information pertaining to an unknown vehicle to be obtained through listening for wireless transmissions and sending information pertaining to the wireless transmissions to a remote facility. The remote facility can include one or more servers that are configured to receive the information from a wireless receiving device (WRD) (e.g., a communications device in another vehicle with wireless communication capabilities, a wireless router, a personal mobile device), determine characteristics concerning the unknown vehicle based on evaluating the obtained information in connection with vehicle information data that is stored in a vehicle information database (e.g., vehicle dimension data, previously obtained vehicle characteristics), and store the characteristics (or other information). In some embodiments, an electronic signature can be generated based on the wireless signals and, thereafter, the electronic signature can be compared with vehicle information stored in one or more databases to determine characteristics concerning the unknown vehicle.

As used herein, an "unknown vehicle" is a vehicle that does not have a data connection with the remote facility that is carrying out the method discussed herein. For example, the remote facility may provide backend services to a plurality of vehicles via cellular and/or other remote communications, the plurality of vehicles being "known vehicles" when a data connection with the remote facility (or other server performing the method) is present. Thus, the other vehicles to which the remote facility (or other server performing the method) does not provide regular data services (e.g., backend services) would be considered "unknown vehicles" since information pertaining to those vehicles may not be directly gathered by (or "unknown" to) the remote facility. In many scenarios, "unknown vehicles" can include those that do not have the proper credentials to connect to the remote facility or those vehicles in which the remote facility does not have the potential credentials to connect to. And, also, vehicles that normally are able to connect to the remote facility but that cannot presently connect or do not presently have a data connection to the remote facility may, in some embodiments, be considered "unknown vehicles."

In many embodiments, vehicle information can be obtained such that the system can locate the unknown vehicle, identify the unknown vehicle, and/or obtain other information or characteristics based on the wireless signals. For example, a service set identifier (SSID) can be obtained by the wireless receiving device (WRD) through listening for wireless signals using a Wi-Fi™ protocol (i.e., an IEEE 802.11); likewise, a Bluetooth™ address (BD_ADDR) can be obtained by the WRD by listening for wireless signals using a Bluetooth™ protocol (i.e., an IEEE 802.15 protocol). This information (i.e., the SSID and BD_ADDR) can be sent to the remote facility that can then use this information to generate an electronic signature, which, for example, may be a combination of the SSID and BD_ADDR. Then, the facility can query one or more databases to determine if this electronic signature had been previously observed and, if so, the transmitting vehicle can be identified or at least associated with a wireless transmitting device (WTD) (e.g., an unknown vehicle) that included the same, similar, or corresponding electronic signature.

In a particular embodiment, the wireless signals that are received by the WRD can be used by the remote facility to identify the location of a lost or missing vehicle. For example, in some scenarios, when a vehicle is stolen, vehicle telematics functionality may be terminated and/or damaged such that the vehicle may lose its remote communications connection with the remote facility (i.e., an unknown vehicle) and, thus, may not be able to readily report its location to the remote facility. In such a scenario, the unknown vehicle's short-range wireless communications (SRWC) (e.g., Wi-Fi™ Bluetooth™, vehicle-to-vehicle (V2V) communications) may still function. Surrounding wireless receiving devices (WRDs) may then listen for certain SRWC transmissions and report such transmissions (or information pertaining to the transmissions) back to a remote facility. The remote facility can then process the information received from the WRDs to determine whether the transmitting device is the lost or missing vehicle.

With reference to FIG. 1, there is shown an operating environment that comprises a communications system 10 and that can be used to implement the method disclosed herein. Communications system 10 generally includes a vehicle 12 with a wireless communications device 30 (e.g., a wireless receiving device (WRD)), an unknown vehicle 14, a constellation of global navigation satellite system (GNSS) satellites 60, one or more wireless carrier systems 70, a land communications network 76, a computer 78, a remote facility 80, and a personal mobile device 90. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicles 12 and/or 14). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicles 12,14 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a remote server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to vehicles 12 and/or 14. In one embodiment, computers 78 can be used to carry out the method discussed herein; in other embodiments, the method can be carried out by servers or other computing devices at remote facility 80, as discussed more below; and, it yet another embodiment, the method can be carried out by a combination of computers 78 and servers at remote facility 80.

Remote facility 80 may be designed to provide the vehicle electronics 20 and mobile device 90 with a number of different system back-end functions through use of one or more electronic servers. When the remote facility is connected to vehicle 12, vehicle 12 is considered a known vehicle. Although vehicle 14 is discussed herein as being an unknown vehicle that is not connected to remote facility 80 via cellular carrier system 70 or land network 76, other embodiments exist, such as those where vehicle 14 is a known vehicle—that is, where vehicle 14 is connected to remote facility 80.

The remote facility 80 includes servers 82 and databases 84, which may be stored on a plurality of memory devices. Also, remote facility 80 can include one or more switches, live advisors, an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. Data transmissions may also be conducted by wireless systems, such as IEEE 802.11x, GPRS, and the like. Those skilled in the art will appreciate that, although only one remote facility 80 and one computer 78 are depicted in the illustrated embodiment, numerous remote facilities 80 and/or computers 78 may be used.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware programs stored in the memory (e.g., EEPROM, RAM, ROM), which enable the servers 82 to provide a wide variety of services. For instance, the at least one processor can execute programs or process data to carry out at least a part of the method discussed herein. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Remote facility 80 can include a number of routers, modems, switches, or other network devices that can be used to provide networking capabilities, such as connecting with land network 76 and/or cellular carrier system 70. In one embodiment, servers 82 include an application that carries out at least some of the method illustrated below in FIGS. 2 and 3.

Databases 84 can be stored on a plurality of memory, such as RAM, other temporary powered memory, any non-transitory computer-readable medium (e.g., EEPROM), or any other electronic computer medium that stores some or all of the software needed to carry out the various external device functions discussed herein. One or more databases at the remote facility can store account information such as subscriber authentication information, vehicle identifiers, profile records, behavioral patterns, and other pertinent subscriber information. Also, a vehicle information database can be included that stores information pertaining to one or more vehicles. One type of vehicle information database may be a vehicle characteristic database that includes information gathered from analyzing wireless transmissions and signals from a plurality of unknown vehicles, such as unknown vehicle 14. The vehicle characteristic database can be used to store a variety of characteristics concerning the plurality of unknown vehicles, electronic signatures generated based on information pertaining to wireless signals transmitted by the unknown vehicles, location data (including estimated location information) concerning the unknown vehicles, and other information pertaining to the unknown vehicles and/or their wireless transmissions. Also, a vehicle dimension database may be included that stores and manages information pertaining to various properties of vehicles, such as make, model, model-year, engine type, communication capabilities, onboard electronics, etc.

The personal mobile device 90 is a mobile device and may include: hardware, software, and/or firmware enabling cellular telecommunications and short-range wireless communications (SRWC) as well as other mobile device applications. As used herein, a personal mobile device is a mobile device that is capable of SRWC, that is portable by a user, and where the portability of the device is at least partly dependent on the user, such as a wearable device (e.g., a smartwatch), an implantable device, or a handheld device (e.g., a smartphone, a tablet, a laptop). As used herein, a short-range wireless communications (SRWC) device is a device capable of SRWC and that includes the requisite SRWC circuitry to perform such SRWC. In one embodiment, the personal mobile device 90 can include a wireless receiving device (WRD) that can be used to listen for wireless signals and then send information pertaining to such wireless signals to a remote server, such as those at remote facility 80 or computer 78. The hardware of personal mobile device 90 may comprise: a processor and memory (e.g., non-transitory computer readable medium configured to operate with the processor) for storing the software, firmware, etc. The personal mobile device's processor and memory may enable various software applications, which may be preinstalled or installed by the user (or manufacturer) (e.g., having a software application or graphical user interface (GUI)). One implementation of a mobile device application may enable the personal mobile device 90 to listen for wireless signals and, thereafter, to send information pertaining to the wireless signals to a remote server, such as a server at remote facility 80 or computer 78.

In one embodiment, personal mobile device 90 may include a wireless receiving device (WRD), which may be used as a part of one or more embodiments of the method discussed herein. As used herein, a wireless receiving device (WRD) is a device that includes wireless communication circuitry such that it is capable of listening for one or more wireless signals and reporting information pertaining to the wireless signals back to a remote facility or server, such as remote facility 80 or computers 78. And, as used herein, a wireless transmission device (WTD) is a device that includes wireless communication circuitry such that it is capable of transmitting one or more wireless signals. Thus, a WRD may receive wireless signals from a WTD and, then, may report information pertaining to the wireless signals to a remote facility or server, such as remote facility 80 or computers 78. As those skilled in the art will recognize, many WRDs may also include transmission means and many WTDs may be able to also receive wireless signals.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) module 22, engine control unit (ECU) 24, a wireless communications device 30 (e.g., a wireless receiving device (WRD)), other vehicle system modules (VSMs) 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GNSS module 22, ECU 24, wireless communications device 30, and vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Wireless communications device 30 is a wireless receiving device (WRD) and is capable of communicating data via short-range wireless communications (SRWC). And, in some embodiments, wireless communications device 30 may be capable of communicating data via cellular network communications through use of a cellular chipset 34, as depicted in the illustrated embodiment. Wireless communications device 30 includes an SRWC circuit 32, a cellular chipset 34, a processor 36, memory 38, and antennas 40 and 50. In one embodiment, wireless communications device 30 may be a standalone module or, in other embodiments, device 30 may be incorporated or included as a part of one or more other vehicle system modules, such as a center stack module (CSM), a body control module (BCM), an infotainment module, a telematics unit, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™ WiMAX™, ZigBee™, Wi-Fi Direct™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In other embodiments, the cellular chipset 34 may be incorporated into another VSM, such as a separate telematics unit.

Wireless communications device 30 may enable vehicle 12 to be in communication with one or more remote networks (e.g., one or more networks at remote facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may include RAM, other temporary powered memory, any non-transitory computer-readable medium (e.g., EEPROM), or any other electronic computer medium that stores some or all of the software needed to carry out the various external device functions discussed herein.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a body control module or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as personal mobile devices 90 or unknown vehicle 14. A connection between the wireless communications device 30 and one or more devices 90 may allow for the operation of various vehicle-device functionality. Vehicle-device functionality (or function) refers to any function of the vehicle that may be complimented, improved, supported, or carried out through a mobile device; any function of the mobile device that may be complimented, improved, supported, or carried out through the vehicle; or any other function that may be carried out using the vehicle and one or more mobile devices. For example, vehicle-device functionality can include using the mobile device 90 to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the mobile device 90 (such as information obtained from the GPS module 22) or vehicle diagnostic information or codes; and carrying out commands (e.g., commands to perform certain vehicle functions) received at the vehicle from the personal mobile device.

The wireless communications device 30 may be configured to listen for one or more wireless signals, such as those that may be sent by unknown vehicle 14. In one embodiment, wireless communications device 30 may receive a message from a remote facility 80 that directs the device 30 to listen for wireless signals from wireless transmission devices, such as unknown vehicle 14. In another embodiment, the vehicle 12 may be preconfigured to listen for such wireless signals depending a particular vehicle state, such as depending on whether the vehicle is in a powered on state. The vehicle 12 can also be preconfigured or remotely configured (via over the air (OTA) programming) to process the received wireless signals and, thereafter, to send information pertaining to the wireless signals to a remote server, such as a server at remote facility 80 or computer 78. In one embodiment, the vehicle 12 may send the entire contents of the wireless signals to the remote servers; or, the vehicle 12 may send portions of the contents of the wireless signals (i.e., "signal data" as discussed more below); or, the vehicle 12 may send signal characteristics of the wireless signals, such as frequency values, information regarding imperfections in transmission, and/or other wave properties of the wireless signals.

In one embodiment, wireless communications device 30 may be set to a discovery mode when an established wireless connection between the vehicle and another device is desired or when information pertaining to wireless transmission devices (e.g., unknown vehicle 14) surrounding the vehicle 12 is desired. As used herein, a discovery mode is an operating mode for a SRWC device in which the SRWC device sends out wireless messages that typically are intended to discover or detect other SRWC devices using a SRWC protocol or technology. The discovery mode may include periodically or intermittently sending out messages or advertisements in an attempt to elicit a response from other SRWC devices in range. In one embodiment, the wireless communications device 30 may transmit a Bluetooth™ Low Energy advertising package (e.g., an advertisement), such as an ADV_IND (an undirected advertisement) message, an ADV_DIRECT_IND (a directed advertisement) message, or an ADV_SCAN_IND (scanable undirected advertisement). For example, the wireless communications device 30 may transmit an ADV_IND message according to a predefined or predetermined time interval (e.g., 30 milliseconds (ms)). Or, the device 30 may vary the time interval by randomizing the interval (e.g., randomly or pseudo-randomly selecting a time between 10 ms and 40 ms for each advertisement).

In one particular embodiment, vehicle 12 may be configured to listen for wireless signals and then process the wireless signals according to one or more criteria. In the wireless signals meet certain criteria (or threshold criteria), then the vehicle 12 may desire to obtain more information regarding the wireless transmission device (WTD) or unknown vehicle that transmitted the wireless signals. Thus, the vehicle 12 may configure the wireless communications device 30 to operate in a discovery mode and/or another mode which acts to communicate wirelessly with the WTD. In another example, information may be sent in response to receiving the wireless signals and/or in response to the wireless signals meeting threshold criteria. In one example, the threshold criteria may be whether the WTD that transmitted the wireless signals is a vehicle or an unknown vehicle. After sending this information to the remote facility, vehicle 12 may then listen for a response from the remote facility, which can include a specific inquiry request that indicates that more information regarding the WTD (e.g., unknown vehicle 14) is requested. In response to receiving the specific inquiry request from the remote facility, the vehicle 12 may use wireless communications device 30 to transmit a wireless signal to the unknown vehicle 14 to elicit the unknown vehicle 14 to transmit more wireless signals, some or all of which can be used to obtain more information regarding the unknown vehicle 14 (or other WTD). In one particular embodiment, these signals that are transmitted by the device 30 may be a product of setting the device 30 to a discovery mode.

As discussed above, device 30 of vehicle 12 (or other WRD) may attempt to establish a SRWC connection with a corresponding communications device installed on the unknown vehicle 14 (or other WTD) such that it may obtain other information concerning vehicle 14. For example, in one scenario, the vehicle 12 (or remote facility 80) may determine that the information pertaining to the wireless signals received from the unknown vehicle 14 indicate that vehicle 14 may be a lost or missing vehicle (or other vehicle of interest). Thus, the vehicle 12 may be directed (e.g., via its own internal logic, via directions from remote facility 80) to establish a SRWC connection with unknown vehicle 14. In other embodiments, vehicle 12 may establish a connection with personal mobile device 90, other SRWC devices, and/or other vehicles.

Upon detection of a SRWC device (e.g., personal mobile device 90, unknown vehicle 14) or receipt of a wireless advertisement or other message from the SRWC device, the wireless communications device 30 may communicate with the SRWC device to establish a secured connection by transmitting and receiving one or more wireless messages. In other embodiments, the SRWC may send information pertaining to the received messages or signals to a remote server. And, in some embodiments, subsequent communications between the vehicle and the wireless transmissions device (WTD) (e.g., unknown vehicle 14) may be carried out to establish a secured SRWC connection. For example, vehicle 12 and unknown vehicle 14 may carry out a pairing process to establish a Bluetooth™ Low Energy connection.

The establishment of the secured SRWC connection may include generating and/or sharing a secret between the vehicle and the SRWC device (e.g., mobile device 90). Once the SRWC device and the vehicle 12 obtain the shared secret, the SRWC device and vehicle 12 can store the shared secret. The storing of the shared secret at each respective device results in the devices being "bonded" to one another such that establishment of future SRWC connections between the SRWC device and vehicle 12 may be expedited by accessing the stored shared secret instead of having to generate a new shared secret. In some cases, the SRWC device and the wireless communication device 30 may already have been "bonded" to one another. As used herein, "bonded" means that two devices (e.g., the wireless communications device 30 and personal mobile device 90) have previously obtained a shared secret and each has stored the shared secret, which may be an identifier, and/or other information that allows the devices to subsequently establish a new connection without having to carry out the pairing process (i.e., exchanging security codes or keys). "Bluetooth™ bonded" refers to devices that are bonded using Bluetooth™ as the SRWC. Upon detection of a SRWC device, the wireless communications device 30 may determine whether the wireless communications device 30 is bonded to the SRWC device.

Once a connection is established between the wireless communications device 30 and the SRWC device, such as mobile device 90 or unknown vehicle 14, wireless messages may be sent between the vehicle and the SRWC device. These wireless messages and/or the SRWC device that sent these wireless messages may be authenticated and/or authorized by the vehicle. The authorization and/or authentication of the SRWC device may include verifying the identity of the SRWC device and/or the user of the SRWC device, as well as checking for authorization of the SRWC device and/or the user of the SRWC device. This verification may include comparing a key (e.g., a string or array of bits) included in the connection request (or subsequent message) with a key that the vehicle obtained from a remote facility 80.

In one embodiment, vehicle 12 and personal mobile device 90 (e.g., a smartphone) may establish a SRWC connection, and the communications between the vehicle and the personal mobile devices may allow for functionality of the smartphone to be used by the vehicle electronics, or vice versa. For example, in the case where the personal mobile device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 90 may be sent to the visual display 58 via the wireless communications device 30. Also, audio received at microphone 56 in the vehicle electronics may be sent to the smartphone 90 via wireless communications device 30.

In other embodiments, the wireless communications device 30 of the vehicle can be used to connect to or receive information from other nearby vehicles, such as through the use of vehicle-to-vehicle (V2V) (or car-to-car) technologies. As those skilled in the art will appreciate, present V2V systems typically use wireless communications in a GHz band set (e.g., 5.9 GHz in the United States of America); however, V2V systems are still being developed and it is contemplated that vehicle 12 may communicate with other vehicle systems through use of newly developed and future V2V systems. The V2V systems can enable vehicles to obtain information regarding other vehicles that are nearby.

The information broadcasted and/or received using V2V technologies may be vehicle position, location, speed, velocity, acceleration, steering-wheel position, braking device states or status, as well as various other information regarding the vehicle's present or anticipated states.

Global navigation satellite system (GNSS) module 22 receives radio signals from a constellation of GNSS satellites. In one embodiment, the GNSS module 22 may be a global positioning system (GPS) module, which may receive GPS signals from a constellation of GPS satellites 60. From these signals, the module 22 can determine vehicle position which may enable the vehicle to determine whether it is at a known location, such as home or workplace. Moreover, GNSS module 22 can provide this location data to wireless communications device 30, which can then use this data to identify known locations, such as a vehicle operator's home or workplace. Or, the location data can be sent back to a remote server (such as servers 82 or computers 78) along with information pertaining to an unknown vehicle. In some cases, the unknown vehicle may be close in proximity to vehicle 12 and, thus, sending the location of vehicle 12 may instruct the remote servers of unknown vehicle 14's approximate location. In other embodiments, unknown vehicle 14 may include a GNSS module and send its location to vehicle 12, which can then forward such information to the remote servers. For example, the vehicle 12 may query the unknown vehicle 14 for its location, or the unknown vehicle 14 may automatically send its location to the vehicle 12 via, for example, vehicle-to-vehicle (V2V) communications or other SRWC communications.

Additionally, GNSS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GNSS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GNSS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Vehicle 14 is a wireless transmission device (WTD) and is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 14 also can include any or all of the vehicle electronics, vehicle system modules (VSMs), and other components of vehicle 12 as discussed above. For example, vehicle 14 can include a GNSS module (similar to GNSS module 22 of vehicle 12), engine control unit (ECU) (similar to ECU 24 of vehicle 12), a wireless communications device (similar to device 30 of vehicle 12), other vehicle system modules (VSMs), and numerous other components and devices. Some or all of the different vehicle electronics may be connected for communication with each other via one or more communication busses. However, in many embodiments, including those particular embodiments discussed in detail herein, vehicle 14 is an unknown vehicle and, thus, in these embodiments, will not have a data communications connection with remote facility 80 (or other remote server(s) carrying out the method as discussed more below). Although unknown vehicle 14 may not have an established connection with remote facility 80 (or other servers implementing the method), that is not to say that unknown vehicle 14 cannot have an established connection with any remote servers.

Figure 2:
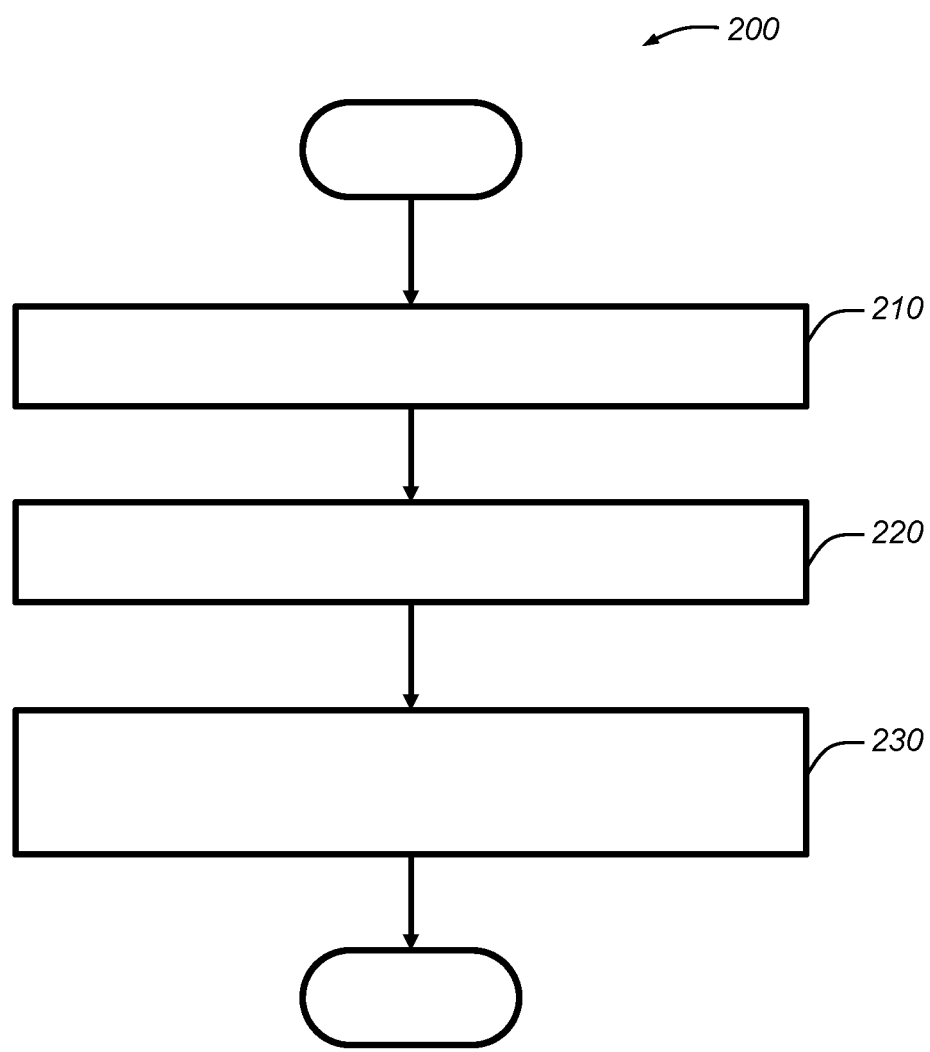
FIG. 2 is a flowchart of an embodiment of a method determining vehicle characteristics of an unknown vehicle through evaluation of wireless signals transmitted by the unknown vehicle.

With reference to FIG. 2, there is shown a method 200 of determining vehicle characteristics of a vehicle through evaluation of wireless signals transmitted by the unknown vehicle. Method 200 begins with step 210, wherein information from a wireless receiving device is obtained. In many embodiments, the wireless receiving device can be the wireless communications device 30 installed on vehicle electronics 20 of vehicle 12. The wireless communications device 30 may be set to a listening mode such that wireless signals may be listened for using the SRWC circuit 32 and/or cellular chipset 32 of device 30. The wireless receiving device (WRD) (e.g., device 30 of vehicle 12) can be configured to listen for wireless signals from one or more wireless transmission devices, such as unknown vehicle 14. In one embodiment, device 30 (or other WRD) may be configured to operate in a passive listening mode, wherein the passive listening mode is a mode of operation in which the device listens for communications from a wireless transmission device but does not send any messages to the wireless transmission device. It should be appreciated that other communications may be carried out by the WRD, such as communications between device 30 and personal mobile device 90, which may be, for example, a smartphone belonging to a passenger of vehicle 12.

In other embodiments, the wireless receiving device may be configured to listen for wireless signals, process the wireless signals based on one or more criteria, and, based on the processing, determine to send information pertaining to the wireless signals to the remote server. The criteria can be a set of guidelines or characteristics that can be used as a basis for determining whether to send the information pertaining to particular wireless signals to the remote facility, such as the threshold criteria discussed above. In other embodiments, the wireless receiving device may be configured to listen for wireless signals of a particular character, such as those that are carried out over a particular frequency or frequency range and/or those that are sent according to a particular protocol (e.g., IEEE 802.11b, IEEE 802.11g, IEEE 802.15.1). And, any combination of criteria previously mentioned may be used in combination with one another when determining whether to send information pertaining to received wireless communications—e.g., a first criteria being whether certain data or types of data is present in the message conveyed by the wireless signals and a second criteria being that the wireless signals be sent according to a particular wireless communication protocol (e.g., IEEE 802.11). Once it is determined to send the information to the remote facility, then the wireless receiving device (WRD) can send the information to the remote facility, such as via cellular carrier system 70 and/or land network 76. The method 200 continues to step 220.

In step 220, one or more characteristics concerning the unknown vehicle are determined based on evaluating the obtained information in connection with vehicle information data that is stored in a vehicle information database. The remote servers can determine these one or more characteristics based on the information received from the vehicle 12, which can include data that was included in the wireless signals. Or, the vehicle 12 can infer or deduct characteristics concerning the vehicles based on properties of the wireless signals (e.g., the wireless protocol used to transmit the signals, frequencies, other wave information) along with other vehicle information. For example, a combination of information concerning the wireless signals, such as the wireless protocol and the SSID, can inform the remote servers of the make of the vehicle (e.g., GM™, Ford™), the model of the vehicle (e.g., Chevrolet™ Malibu™), the model year of the vehicle (e.g., 2016), or other vehicle dimensional data. In one embodiment, the received information pertaining to the wireless signals is used at least in part to query a vehicle characteristic database or vehicle dimension database. The vehicle characteristic database can include store information gathered from analyzing wireless transmissions and signals from a plurality of unknown vehicles. Thus, if information or characteristics concerning the unknown vehicle 14 have already been obtained and stored into the vehicle characteristic database, then this previously stored information can be used to help determine an identity or other characteristics of unknown vehicle 14.

Also, the vehicle dimension database can be used in connection with the received information to determine one or more characteristics concerning the unknown vehicle. The vehicle dimension database includes information regarding various types of vehicles from various OEMs, such as information pertaining to characteristics of vehicle systems and subsystems, such as a particular vehicle model's wireless transmission capabilities or characteristics. For example, if the information received from the WRD (e.g., device 30 of vehicle 12) indicates that the wireless signals used IEEE 802.11g and that the vehicle is a particular vehicle model, then the vehicle dimension database can be queried to determine which model years of the particular vehicle model use the IEEE 802.11g protocol. This query can then present the possible identity or characteristics of the particular model/model-year vehicle that transmitted the wireless signals. In some embodiments, the vehicle dimension database can be located at remote facility 80 (e.g., databases 84) and, in other embodiments, the vehicle dimension database can be located at a location remote from remote facility 80, such as those kept at a third party's remote server and accessibly via an application programming interface (API). The method 200 continues to step 230.

In step 230, the one or more characteristics concerning the unknown vehicle are stored in a database. In one embodiment, the characteristics are stored in databases 44. And, in some embodiments, an electronic signature can be generated (see step 340 in FIG. 3) based on the information received from the vehicle 12. The electronic signature can also be stored in databases 44 along with the characteristics. Other information may be stored as well, including metadata of the wireless signals or that which is generated by vehicle 12, the identity of the WRD, the identity of the vehicle housing the WRD (e.g., vehicle 12), the location of the unknown vehicle 14 or vehicle 12, and/or various other information. The method 200 then ends.

Figure 3:
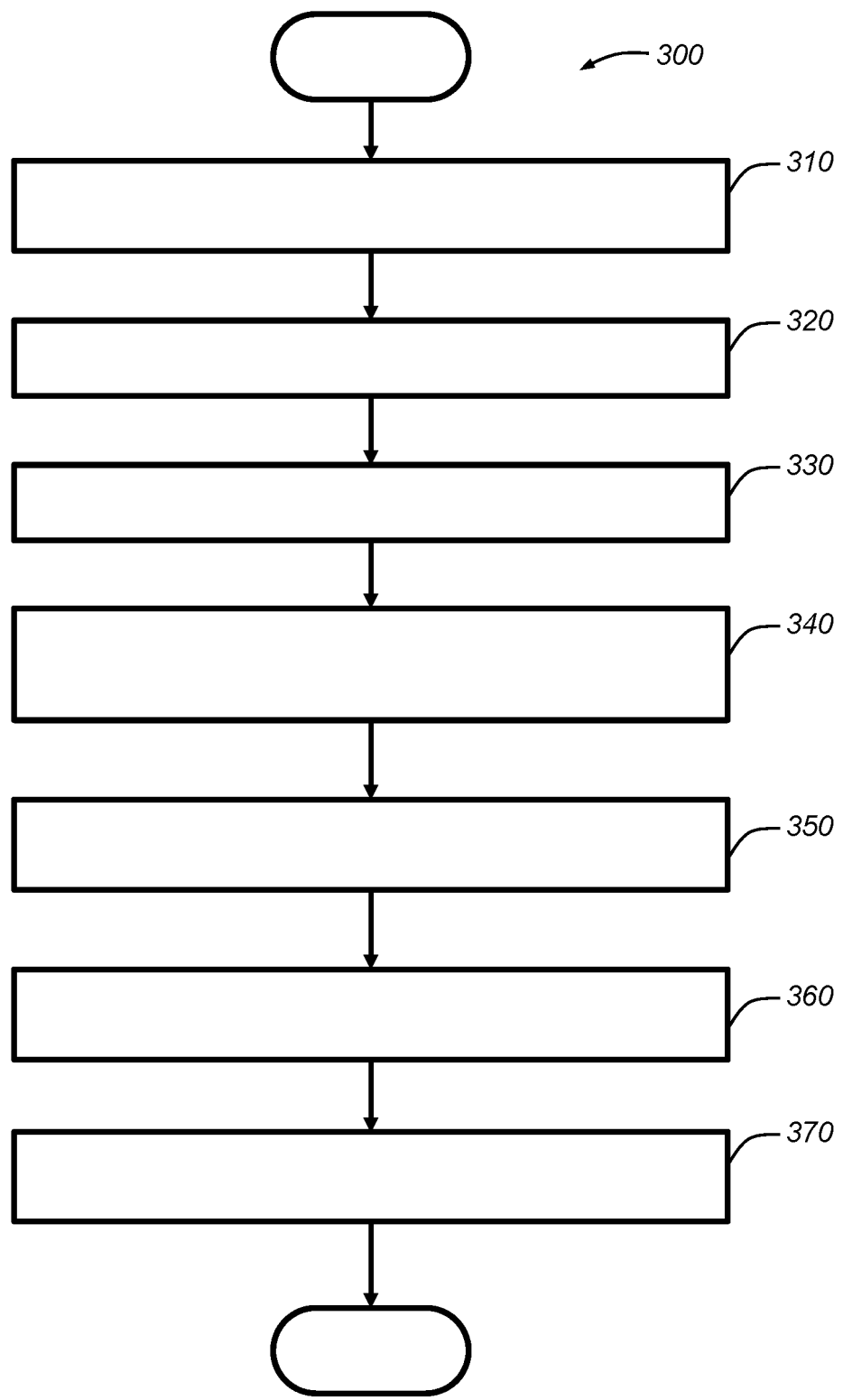
FIG. 3 is a flowchart of an embodiment of a method determining vehicle characteristics of an unknown vehicle through evaluation of wireless signals transmitted by the unknown vehicle.

With reference to FIG. 3, there is shown a method 300 of determining vehicle characteristics of an unknown vehicle through evaluation of wireless signals transmitted by the unknown vehicle. Method 300 begins with step 310, wherein at least one vehicle is instructed to listen for wireless signals. In one embodiment, remote servers 82 can send out instructions or directions to a plurality of vehicles that direct the vehicles to operate their respective WRDs (e.g., wireless communications devices 30) in a way as to receive and/or record wireless signals and/or transmissions. In this way, the servers can inform a plurality of wireless receiving devices to listen for one or more wireless signals and, as mentioned above, the wireless communications device 30 of the vehicle 12 can be one of the wireless receiving devices.

In other embodiments, wireless communications device 30 of vehicle 12 or other WRD may be preconfigured to listen for wireless signals. And, in a particular embodiment, the wireless communications device 30 or other WRD can be configured to listen for wireless signals upon the occurrence of a triggering event (e.g., a transition from vehicle powered off state to vehicle powered on state), to listen according to a schedule, and/or to listen upon the receipt of a message from a remote facility. In other embodiments, the vehicle 12 can always be listening while the vehicle is on and/or has enough battery to operate the WRD in a listening mode while the vehicle is off (e.g., in an auxiliary state). The method 300 continues to step 320.

In step 320, information from a wireless receiving device is obtained. The information can be sent from device 30 (or other WRD) to the remote servers 82 or computers 78. The information can be sent in any way as discussed above, including those discussed in step 210 of method 200 above (FIG. 2). Also, before the information is sent, the vehicle may use processor 36 to analyze the information, which can include determining whether the wireless signals meet threshold criteria. In one example, information pertaining to only vehicles may be desired (as opposed to all WTDs). Thus, threshold criteria may be stored in memory 38 and used by processor 36 to determine whether the wireless signals were sent from a communications device (a WTD) included in a vehicle. And, in some embodiments, it may be difficult for the vehicle 12 to discern whether the wireless signals were sent from a vehicle and, thus, certain threshold criteria may be established that acts as a filter that ignores wireless signals with particular characteristics, while validating (i.e., determining the wireless signals meet the threshold criteria) wireless signals with other characteristics. The threshold criteria can thereby act as a filter as to improve the likelihood that the obtained information pertains to were sent from a vehicle (or otherwise are likely to meet the threshold criteria).

In some embodiments, in response to the wireless communications device 30 sending information pertaining to the wireless signals to the remote facility, the remote facility may process the information and send a response message to the device 30, such as a specific inquiry request. As mentioned above, the specific inquiry request can be received by the vehicle and inform the vehicle that more information regarding the WTD or unknown vehicle that sent the wireless signals is requested. Thus, in some embodiments, the vehicle 12 can seek to establish a SRWC connection (or other wireless connection) with unknown vehicle 14, which can then be used to obtain more information pertaining to vehicle 14. In one example, V2V technology can be used by vehicle 12 and/or vehicle 14 as to allow vehicle 12 to obtain more information regarding the vehicle 14. In other embodiments, the vehicle 12 may merely set wireless communications device 30 to a discovery mode with an intent to elicit information via wireless signals from unknown vehicle 14, but without the express intent on actually establishing a connection with unknown vehicle 14, which, as those skilled in the art will appreciate, is generally the primary purpose of discovery mode. The method 300 then continues to step 330.

In step 330, location data is received at the remote servers. For example, as mentioned above, location information concerning the unknown vehicle may be desired, especially in circumstances where the primary objective is to locate the unknown vehicle 14, such as is the case when unknown vehicle 14 has been stolen or is missing and lacks a connection to remote facility 80 (or other long-distance communication connections). And, in other embodiments, location data (e.g., GNSS coordinates, street address) of vehicle 12 or vehicle 14 may provide insight into the other information sent to the remote servers (see step 320). In a particular embodiment, once vehicle 12 receives the wireless signals, then the vehicle can use GNSS module 22 to obtain a present location of vehicle 12. This location information can then be sent to remote servers 82 or computers 78. In another embodiment, vehicle 12 may receive location information from unknown vehicle 14 via V2V or other SRWC. And, in some embodiments, the location data may be sent along in the same message as the information that is sent in step 320; in other embodiments, separate messages are used. The method 300 continues to step 340.

In step 340, an electronic signature for the unknown vehicle is generated based on the obtained information. As used herein, an "electronic signature" is data (e.g., a string of bits, bytes, numbers, alphanumeric characters, symbols) generated from the obtained information that can be used to distinguish one wireless transmission device from another, or at least that can be used to increase the likelihood that the received wireless signals were transmitted or originated from one wireless transmission device rather than from another. In one embodiment, an electronic signature for the unknown vehicle is generated based on signal data from the wireless signals. As used herein, "signal data" is data that is being conveyed by the one or more wireless signals (e.g., encoded data). In one particular embodiment, the electronic signature can be generated based on a single, or based on a combination of a plurality of, wireless device identifiers, such as a media access control (MAC) address, a service set identifier (SSID), a wireless friendly name, a Bluetooth™ address (BD_ADDR), an integrated circuit card identifier (ICCID) of a subscriber identity module (SIM) card, an international mobile subscriber identity (IMSI) associated with a SIM card, or an issuer identification number associated with a SIM card.

In one embodiment where the electronic signature is generated based on one or more wireless identifiers, such as those listed above, it is possible that the wireless identifiers are dynamic such that their values or addresses changes. However, if the precise algorithm or methodology in which the value/address change is effected is known to the remote facility (or accessible thereby), then the remote facility can determine the new address (e.g., MAC address) according to the known algorithm and, thus, can then associated previously identified addresses or electronic signatures with the newly addressed identifiers. In one particular example, a media access control (MAC) address may dynamically change, but in a predictable or known manner. Thus, a MAC address that is received from the WRD can be used to determine a previous MAC address of the WRD, which can allow the remote facility 80 to associate old information (that was associated with the previous MAC address or an electronic signature based on the previous MAC address) with the obtained information. In one scenario, a vehicle manufacturer of a plurality of unknown vehicles may issue new MAC addresses (or other wireless or network identifiers) to the plurality of unknown vehicles. These addresses may be obtained by an operator (or server) of the remote facility and then used to correspond previous obtained information associated with previous identifiers to the new identifiers. In other embodiments, the new identifiers may be analyzed so as to determine one or more vehicles or types of vehicles to which the new identifiers correspond.

In other embodiments, the electronic signature can be based on signal characteristics, such as frequency, amplitude, or other wave properties. In one particular embodiment, imperfections of the WTD can be identified and used in generating the electronic signature. For example, through use of wave spectrogram techniques, a fingerprint of the wireless signals can be generated using known techniques that use the unique or uncommon imperfections of a transmitter of the WTD to generate an electronic signature that can be used to uniquely identify the transmitter (or at least increase the likelihood of unique identification—i.e., the imperfections may not lead to always generating a unique identifier, depending on the algorithm or methodology used). Stated differently, one or more signal characteristics may be based on imperfections in a transmitter that is included in the vehicle and that is used to transmit the one or more wireless signals, and the electronic signature for the unknown vehicle is generated based on the imperfections in the transmitter. And, as will be explained in more detail below, the electronic signature can be stored and, when information concerning other wireless signals are obtained in the future, a new electronic signature can be generated and compared with those previously generated electronic signatures in an attempt to recognize that the new wireless signals are from the same WTD (i.e., the WTD that transmitted the signals of which the first electronic signature was based upon). The method 300 continues to step 350.

In step 350, it is determined whether information pertaining to the unknown vehicle exists in a vehicle information database based on the electronic signature for the unknown vehicle. As mentioned above, a plurality of electronic signatures may be stored in databases 84 of remote facility 80, such as in the vehicle characteristic database. And, also, information pertaining to an unknown vehicle (or WTD)

may have been previously stored along with an electronic signature. Thus, using the electronic signature generated in step 340, information pertaining to the same WTD (or unknown vehicle) may be obtained through querying the database for the electronic signature. Also, since the electronic signature is based on information that can be attributed to signal properties of the one or more wireless signals, variations in the electronic signature may arise; however, to make up for this, the vehicle characteristic database can be queried for electronic signatures that are similar or that correspond to the generated electronic signature.

Also, in some embodiments, the remote facility 80 may determine that the WTD associated with the generated electronic signature is a vehicle of interest. A vehicle of interest is a vehicle of which more information is particularly desired or requested, such as a vehicle that is presently indicated as missing, lost, or stolen. Thus, in such a scenario, the remote facility 80 can use servers 82 to generate and send a request for more information (such as a specific inquiry request, as discussed above) to the WRD (e.g., device 30 of vehicle 12) in an attempt to obtain more information regarding the vehicle of interest. Then, the vehicle 12 may carry out one or more steps, such as trying to learn more information regarding the WTD (or unknown vehicle 14) and, thereafter, to send the results or information (e.g., location data) back to the remote servers 82. The method 300 then continues to step 360.

In step 360, one or more characteristics concerning the unknown vehicle are determined based on evaluating the obtained information in connection with vehicle information data that is stored in a vehicle information database. This step can be carried out according to any of the embodiments discussed above in step 220 (FIG. 2). In one particular embodiment, information may already be stored relating to the WTD or unknown vehicle 14, as may be determined in step 350 by comparing the generated electronic signature to those electronic signatures stored in then vehicle characteristic database or other database. And, even if it is determined that an entry for a corresponding electronic signature exists in the vehicle characteristics database (or other database), the obtained information (step 320) may still be used to determine one or more characteristics and/or to supplement those characteristics already stored in databases 84. The method 300 then proceeds to step 370.

In step 370, the one or more characteristics concerning the unknown vehicle are stored in a database. This step is analogous to step 230 of method 200 (FIG. 2) and, thus, may be carried out according to any of the embodiments discussed above in step 230. In one embodiment, the characteristics can be stored into the vehicle characteristic database along with the generated electronic signature. And, in other embodiments, an already existing data tuple in the vehicle characteristic database can be updated to include more information, such as any of the one or more characteristics. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method of determining vehicle characteristics of an unknown vehicle through evaluation of wireless signals transmitted by the unknown vehicle, wherein the method comprises:
    obtaining information from a wireless receiving device, wherein the wireless receiving device is configured to listen for wireless signals from one or more wireless transmission devices, wherein the obtained information is based at least partly on one or more wireless signals transmitted by an unknown vehicle, wherein the one or more wireless signals only include non-uniquely identifying vehicle information, wherein the obtained information includes signal data that was included in the one or more wireless signals, wherein the signal data includes a plurality of wireless device identifiers, and wherein an electronic signature for the unknown vehicle is generated based on a combination of the plurality of wireless device identifiers;
    determining one or more characteristics concerning the unknown vehicle based on evaluating the obtained information in connection with vehicle information data that is stored in a vehicle information database; and
    storing the one or more characteristics concerning the unknown vehicle in a database.

2. The method of claim 1, wherein the obtained information pertains to one or more signal characteristics of the wireless signals.

3. The method of claim 2, wherein the one or more signal characteristics includes a wireless protocol used for transmitting the one or more wireless signals.

4. The method of claim 2, wherein the one or more signal characteristics includes one or more frequencies of the one or more wireless signals.

5. The method of claim 4, wherein the one or more signal characteristics are based on imperfections in a transmitter that is included in the unknown vehicle and that is used to transmit the one or more wireless signals.

6. The method of claim 5, wherein the electronic signature for the unknown vehicle is generated based on the imperfections in the transmitter.

7. The method of claim 1, wherein the wireless receiving device is included in a second vehicle, and wherein the second vehicle includes a telematics unit that is configured to provide the received information to the one or more servers.

8. The method of claim 1, further comprising the step of: informing a plurality of wireless receiving devices to listen for wireless signals, wherein the wireless receiving device is one of the plurality of wireless receiving devices.

9. The method of claim 8, further comprising the step of determining whether the unknown vehicle is a vehicle of interest based on the determining step, and wherein the vehicle of interest is a lost or missing vehicle.

10. The method of claim 1, further comprising the step of receiving a location of the wireless receiving device and/or the unknown vehicle at the one or more servers.

11. A method of determining vehicle characteristics of an unknown vehicle through evaluation of wireless signals transmitted by the unknown vehicle, wherein the method comprises:
    obtaining information from a wireless receiving device, wherein the wireless receiving device is configured to listen for wireless signals from one or more wireless transmission devices, wherein the obtained information is based at least partly on one or more wireless signals transmitted by an unknown vehicle, and wherein the one or more wireless signals only include non-uniquely identifying vehicle information;
    determining one or more characteristics concerning the unknown vehicle based on evaluating the obtained information in connection with vehicle information data that is stored in a vehicle information database; and
    storing the one or more characteristics concerning the unknown vehicle in a database;
    wherein the vehicle information database is a vehicle dimension database, and wherein the one or more characteristics are stored in a vehicle characteristic database along with an electronic signature.

12. The method of claim 11, wherein the obtained information includes signal data that was included in the one or more wireless signals.

13. The method of claim 12, wherein the signal data includes at least one wireless device identifier.

14. The method of claim 13, wherein the signal data includes a plurality of wireless device identifiers.

15. The method of claim 14, wherein the electronic signature for the unknown vehicle is generated based on a combination of the plurality of wireless device identifiers.

16. The method of claim 13, wherein the at least one wireless device identifier is any one of the following: a media access control (MAC) address, a service set identifier (SSID), a wireless friendly name, a Bluetooth™ address (BD_ADDR), an integrated circuit card identifier (ICCID) of a subscriber identity module (SIM) card, an international mobile subscriber identity (IMSI) associated with a SIM card, or an issuer identification number associated with a SIM card.

17. The method of claim 11, further comprising the step of generating the electronic signature based on the obtained information.

18. A method of determining vehicle characteristics of an unknown vehicle through evaluation of wireless signals transmitted by the unknown vehicle, wherein the method is carried out by one or more servers that include access to a vehicle information database, and wherein the method comprises:
    obtaining information from a wireless receiving device, wherein the wireless receiving device is configured to listen for wireless signals from one or more wireless transmission devices, wherein the obtained information is based at least partly on characteristics of one or more wireless signals transmitted by an unknown vehicle, and wherein the characteristics of the one or more wireless signals includes physical attributes of the one or more wireless signals and/or non-uniquely identifying vehicle data that is being conveyed by the one or more wireless signals;
    generating an electronic signature for the unknown vehicle based on the obtained information;
    determining whether information pertaining to the unknown vehicle exists in a vehicle information database based on the electronic signature for the unknown vehicle;
    determining one or more characteristics concerning the unknown vehicle based on evaluating the obtained information in connection with vehicle dimension data that is stored in a vehicle information database; and
    storing the one or more characteristics concerning the unknown vehicle in a vehicle characteristic database.

19. The method of claim 18, wherein the electronic signature is based on signal data included in the wireless messages.

20. The method of claim 18, wherein the electronic signature is based on imperfections in a transmitter that is included in the unknown vehicle and that is used to transmit the one or more wireless signals.

* * * * *